(12) United States Patent
Belelie et al.

(10) Patent No.: US 7,538,145 B2
(45) Date of Patent: *May 26, 2009

(54) CURABLE PHASE CHANGE COMPOSITIONS AND METHODS FOR USING SUCH COMPOSITIONS

(75) Inventors: Jennifer L. Belelie, Oakville (CA); Peter G. Odell, Mississauga (CA); Darly Vanbesien, Burlington (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/289,521

(22) Filed: Nov. 30, 2005

(65) Prior Publication Data
US 2007/0123601 A1 May 31, 2007

(51) Int. Cl.
*C08F 2/50* (2006.01)
*C09D 4/00* (2006.01)
*C09D 11/10* (2006.01)
*C09D 11/12* (2006.01)

(52) U.S. Cl. .............................. 522/79; 522/71; 522/80; 522/90; 522/95; 522/96; 522/168; 522/169; 522/170; 522/181; 522/178; 522/182; 106/31.01; 106/31.13; 106/31.3; 106/31.32; 106/31.34; 106/31.35; 106/31.08

(58) Field of Classification Search ............... 106/31.29, 106/31.16, 31.01, 31.13, 31.3, 31.32, 31.34, 106/31.35; 522/95, 71, 79, 80, 78, 90, 96, 522/168, 169, 170, 181, 182, 178
See application file for complete search history.

(56) References Cited

U.S. PATENT DOCUMENTS

| | | | |
|---|---|---|---|
| 4,070,262 A | 1/1978 | Guarino et al. | |
| 4,071,425 A | 1/1978 | Guarino et al. | |
| 4,072,592 A | 2/1978 | Due et al. | |
| 4,072,770 A | 2/1978 | Ting | |
| 4,133,909 A | 1/1979 | Spencer | |
| 4,265,976 A | 5/1981 | Nowak | |
| 5,000,786 A * | 3/1991 | Matsuzaki | 106/31.3 |
| 5,041,161 A * | 8/1991 | Cooke et al. | 347/99 |
| 5,162,389 A | 11/1992 | Lee et al. | |
| 5,219,641 A | 6/1993 | Mehta et al. | |
| 5,800,884 A | 9/1998 | D'Anna et al. | |
| 6,385,405 B1 * | 5/2002 | Kingsland | 399/2 |
| 7,153,349 B2 * | 12/2006 | Carlini et al. | 106/31.29 |
| 2004/0028834 A1 * | 2/2004 | Dove et al. | 427/508 |
| 2004/0132862 A1 * | 7/2004 | Woudenberg | 523/160 |
| 2007/0120908 A1 * | 5/2007 | Odell et al. | 347/88 |

OTHER PUBLICATIONS

Crivello et al., "Photoinitiated Cationic Polymerization of Epoxy Alcohol Monomers," Journal of Polymer Science, Part A, Polymer Chemistry, vol. 38, pp. 389-401, 2000.

* cited by examiner

*Primary Examiner*—Sanza L McClendon
(74) *Attorney, Agent, or Firm*—Oliff & Berridge, PLC.

(57) ABSTRACT

The phase change, curable composition comprises curable monomer, photoinitiator that initiates polymerization of the curable monomer, and phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature. A coating over an image may be applied by providing a composition comprising curable monomer at a first temperature; applying the composition over the image, the image being at a second temperature; and exposing the composition to radiation to initiate polymerization of the curable monomer. In this process, the composition has a viscosity at the second temperature that is at least four orders of magnitude greater than its viscosity at the first temperature.

20 Claims, 1 Drawing Sheet

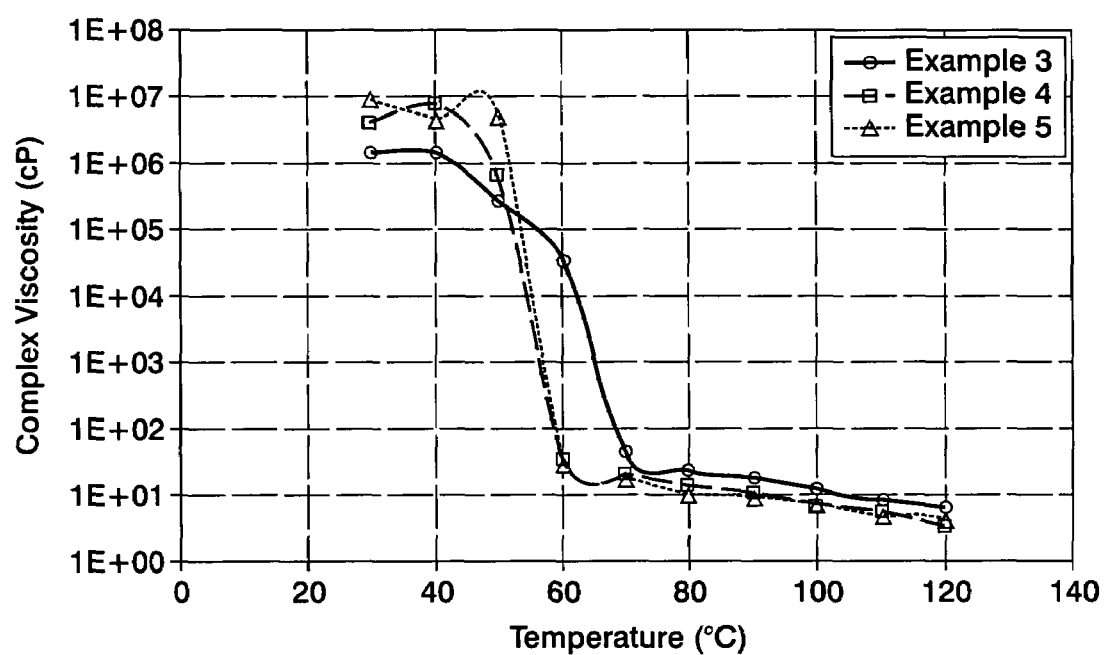

CURABLE PHASE CHANGE COMPOSITIONS AND METHODS FOR USING SUCH COMPOSITIONS

BACKGROUND

The present disclosure generally relates to curable phase change compositions and their use in methods for protecting images on a substrate.

The electrostatographic process, and particularly the xerographic process, is well known. This process involves the formation of an electrostatic latent image on a photoreceptor, followed by development of the image with a developer, and subsequent transfer of the image to a suitable substrate. In xerography, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image on the non-illuminated areas. This electrostatic latent image may then be developed to form a visible image by depositing finely divided electroscopic marking particles, called toner, on the surface of the photoconductive insulating layer. The resulting visible image may then be transferred from the imaging member directly or indirectly (such as by a transfer or other member) to a recording medium, such as transparency or paper. The imaging process may be repeated many times with reusable imaging members.

Known methods of protecting images include adding wax to the toner and applying an overprint coating over the image on the substrate. The overprint coating, often referred to as an overprint varnish or composition, is typically a liquid film coating that may be dried and/or cured. Curing may be accomplished through drying or heating or by applying ultraviolet light or low voltage electron beams to polymerize (crosslink) the components of the overcoat. However, known overprint coatings, such as those described in U.S. Pat. Nos. 4,070,262, 4,071,425, 4,072,592, 4,072,770, 4,133,909, 5,162,389, 5,800,884, 4,265,976, and 5,219,641, for example, fail to adequately protect toner-based prints and do not possess the requisite properties for controlled application, such as, for example, by an ink jet printer.

Typically, known coating formulations are applied using a liquid film coating device, and thus are often applied over the entire surface of the image, i.e., flood coating. Applying a composition to part of an image, i.e., spot coating, is possible, but it requires preparing a plate or cylinder prior to application of the overprint composition. Thus, applying known coating formulations can be inefficient, difficult, and time-consuming and is not desirable for integration with variable-data digital printing.

A need exists for an overprint composition, particularly one that can be applied by ink jet printing, that provides increased heat and abrasion resistance, especially for stress case media, such as flexible packaging and automobile owner manuals.

DESCRIPTION OF CO-PENDING APPLICATIONS

U.S. application Ser. No. 10/838,212 filed May 5, 2004, which is herein incorporated by reference in its entirety, describes an ink jettable overprint composition comprising a curable oligomer that is a low viscosity unsaturated acrylate resin; a curable monomer that is a polyfunctional alkoxylated or polyalkoxylated acrylic monomer comprising one or more di- or tri-acrylates; at least one photoinitiator; and at least one surfactant. The overprint composition has a viscosity ranging from about 15 cP to about 8.0 cP at a temperature ranging from about 40° C. to about 70° C., a surface tension ranging from about 20 to about 30 dynes/cm at about 40° C. to about 70° C. and an oligomer:monomer ratio of about 1:4.

U.S. application Ser. No. 10/838,327 filed May 5, 2004, which is herein incorporated by reference in its entirety, describes an overprint composition comprising a curable oligomer that is a trifunctional unsaturated acrylic resin; a curable monomer that is a polyfunctional alkoxylated or polyalkoxylated acrylic monomer comprising one or more di- or tri-acrylates; at least one photoinitiator; and at least one surfactant. The overprint composition has a viscosity ranging from about 50 cP to about 300 cP at about 25° C., an oligomer:monomer ratio of about 2.5 to about 1, and a surface tension ranging from about 15 to about 40 dynes/cm at about 25° C.

U.S. application Ser. No. 10/838,213 filed May 5, 2004, which is herein incorporated by reference in its entirety, describes an overprint composition comprising at least one oligomer, at least one monomer, at least one photoinitiator, and at least one surfactant, wherein the overprint composition is curable and, when cured on an overprint composition-coated print, allows the coated print to exhibit substantially no thermal cracking after thermal shock.

SUMMARY

The present disclosure relates to a phase change, curable composition. In embodiments, the present disclosure relates to a composition comprising curable monomer, photoinitiator that, when exposed to radiation, initiates polymerization of the curable monomer, and phase change agent that provides the composition with an increase in viscosity of at least four orders of magnitude as the composition is cooled from a first temperature, the first temperature being from 50° C. to 130° C., to a second temperature, the second temperature being from 0° C. to 70° C., with the second temperature being at least 10° C. lower than the first temperature.

The present disclosure also relates to a method for applying a coating over an image on a substrate. In embodiments, the method comprises providing a composition comprising curable monomer at a first temperature; applying the composition over the image, the image being at a second temperature; and exposing the composition to radiation to activate a photoinitiator to initiate polymerization of the curable monomer. In the method, the composition has a viscosity at the second temperature that is at least four orders of magnitude greater than its viscosity at the first temperature. In a preferred embodiment, the composition is applied over the image by ink jet printing.

The present disclosure also relates to a xerographic device comprising an image generating component and an ink jet device comprising a phase change, curable composition described herein. In this device, an image generating component can generate an image on a substrate. Thereafter, the ink jet device jets the composition over the image to form a protective coating over the image.

Because the composition described herein is a phase change composition, when the composition is applied over the image, the image being at a different temperature than the composition, the composition is brought to a temperature at which a phase change occurs. This phase change prevents the composition from rapidly soaking into the substrate. In addition, the substrate is exposed to radiation to activate a photoinitiator to initiate polymerization of the curable monomer, leading to a robust polymer that coats the toner image. This coating may increase the abrasion and heat resistance of the image over which it is applied.

BRIEF DESCRIPTION OF THE DRAWING

The FIGURE depicts the viscosities of three compositions within the present disclosure.

DETAILED DESCRIPTION OF EMBODIMENTS

The composition of the present disclosure is a phase change, curable composition. To provide the curable property of this composition, the composition generally comprises a curable monomer. In embodiments, curing of the monomer is cationically initiated.

In embodiments, the curable monomer is equipped with one or more cationically curable moieties, including, but not limited to, vinyl ethers, epoxides, such as cycloaliphatic epoxides, aliphatic epoxides, and glycidyl epoxides, and oxetanes.

In a particularly preferred embodiment, the monomers are urethanes. These compounds are the reaction product of an isocyanate and an alcohol equipped with at least one cationically polymerizable group, as described in Example 1.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and paratolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl) ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Some specific examples of suitably functionalized alcohols include 1,4-butanediol vinyl ether, 1,4-cyclohexanedimethanol vinyl ether, ethylene glycol vinyl ether, di(ethylene glycol) vinyl ether, glycidol, 3-methyl-3-oxetanemethanol, glycerol diglycidyl ether, all of which are available from Sigma-Aldrich (Milwaukee, Wis.); 3,4-epoxycyclohexanemethanol, which can be prepared as described by Crivello and Liu (J. Polym. Sci. Part A: Polym. Chem. 2000, vol. 38, pp 389-401); and the like.

In particular, the following diurethane divinyl ether oil, bis[4-(vinyloxy)butyl]trimethyl-1,6-hexanediylbiscarbamate (mixture of 2,2,4- and 2,4,4-isomers), which is the reaction product of 1,4-butanediol vinyl ether and trimethyl-1,6-diisocyanatohexane (mixture of 2,2,4- and 2,4,4-isomers) (see Example 1), is particularly preferred:

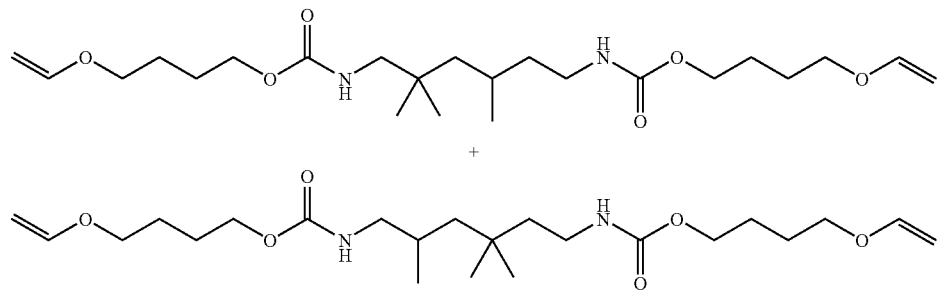

In embodiments, the composition further comprises a photoinitiator that initiates polymerization of the curable monomer. In embodiments, the photoinitiator is activated by ultraviolet light. In preferred embodiments, the photoinitiator is a cationic photoinitiator.

The photoinitiator should be soluble in the composition. Examples of suitable photoinitiators include, but are not limited to, aryldiazonium salts, diaryliodonium salts, triarysulfonium salts, triarylselenonium salts, dialkylphenacylsulfonium salts, triarylsulphoxonium salts and aryloxydiarylsulfonium salts.

The composition of the present disclosure also includes a phase change agent. This phase change agent provides a composition that has an increase in viscosity of at least four orders of magnitude, preferably at least five orders of magnitude. In embodiments, the composition has an increase in viscosity of at least four orders to magnitude, preferably at least five orders of magnitude, from a first temperature, the first temperature being from 50° C. to 130° C., preferably from 60° C. to 120° C., to a second temperature, the second temperature being from 0° C. to 70° C., preferably from 20° C. to 50° C., with the second temperature being at least 10° C.

below the first temperature. In further embodiments, the second temperature is at least 20° C. below, or at least 30° C. below, the first temperature. In embodiments, the composition has an increase in viscosity of at least four orders to magnitude, preferably at least five orders of magnitude, from the jetting temperature of the composition, which is preferably between 50° C. and 130° C., more preferably between 60° C. and 120° C., to the temperature at the image, which is preferably less than or equal to 50° C. Thus, at the image, there is a phase change that keeps the composition on the surface of the image.

This phase change agent can be any component that is miscible with the other components of the composition and is solid at the substrate temperature, preferably at a temperature between 20° C. and 50° C. Solid alcohols are generally preferred.

Examples of suitable phase change agents include, but are not limited to, hydrogenated castor oil, 1-octadecanol, 1,10-decanediol and 1,12-dodecanediol. Other suitable phase change agents include hydroxyl-terminated polyethylene waxes such as mixtures of carbon chains with the structure $CH_3—(CH_2)_n—CH_2OH$, where there is a mixture of chain lengths, n, where the average chain length is preferably in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite (Sand Springs, Okla.).

Other examples of mono functional alcohols that can be employed as phase change agents herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In preferred embodiments, the composition of the present disclosure is colorless and substantially transparent.

The compositions of the present disclosure are preferably formulated, filtered and jetted through piezoelectric print heads. Formulations particularly suitable for over-printing images generally have viscosities between 8 and 15 cP, preferably between 10 and 12 cP, at a temperature between 50 and 130° C. However, the jetting temperature must be within the range of thermal stability of the composition, to prevent premature polymerization in the print head.

In embodiments, the composition is applied over the image pixel by pixel. In other embodiments, the composition is applied through full coverage over the substrate. Techniques for coating an image are described in U.S. application Ser. No. 10/838,212, which is herein incorporated by reference in its entirety.

The formulations generally exhibit an increase in viscosity of at least four orders of magnitude at the substrate temperature, preferably less than or equal to 50° C., to facilitate enough solidification that the composition will remain on the substrate surface until it is cured. After the curable composition is printed over the toner image, it is preferably immediately exposed to radiation to polymerize the reactive groups contained in the formulation to form a robust polymer coating.

In a particularly preferred embodiment, the image is a toner image. The toner image may be formed from emulsion aggregation toner. However, the composition of the present disclosure can also be used to coat images other than toner images, such as ink images.

Since the composition is being used as an overprint composition, at least in embodiments, it is possible to see the image through the coating composition. Thus, in a preferred embodiment, the coating is colorless and substantially transparent.

In embodiments, the composition further comprises a low viscosity additive to reduce the jetting viscosity. Examples of this additive include, but are not limited to, VECTOMERS® 4230, 3080 and 5015 (available from Morflex Inc. Greensboro, N.C.), which have the following chemical structures:

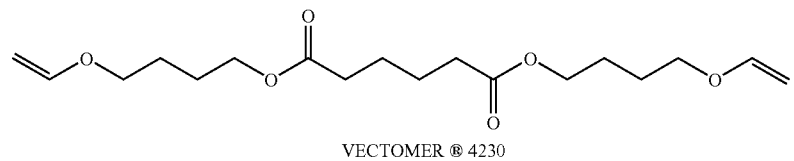
VECTOMER® 4230

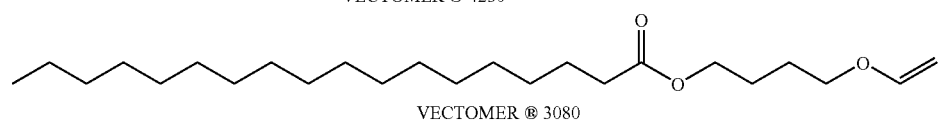
VECTOMER® 3080

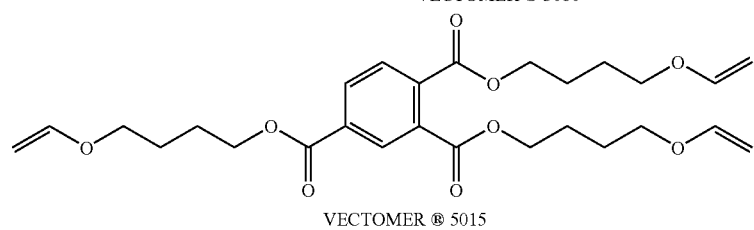
VECTOMER® 5015

Another suitable low viscosity additive is bis[4-(vinyloxy)butyl]dodecanedioate:

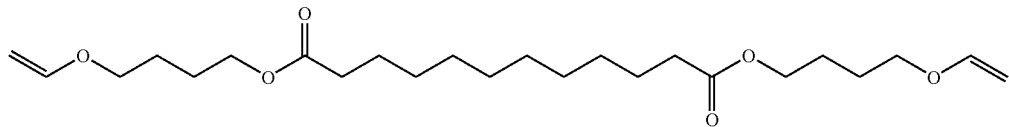

In a preferred embodiment, the composition comprises about 40 to about 70 wt % UV curable monomer, about 10 to about 50 wt % phase change agent, about 1 to about 15 wt % photoinitiator, and 0 to about 20 wt % low viscosity additive.

Additional optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

EXAMPLES

The following examples illustrate specific embodiments of the present disclosure. One skilled in the art would recognize that the appropriate reagents, component ratio/compositions may be adjusted as necessary to achieve specific product characteristics. All parts and percentages are by weight unless otherwise indicated.

Example 1

Preparation of Bis[4-(vinyloxy)butyl]trimethyl-1,6-hexanediylbiscarbamate (mixture of 2,2,4- and 2,4,4-isomers)

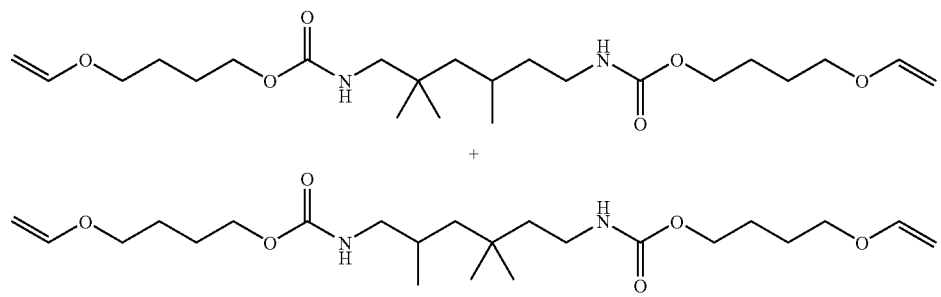

To a 2 L three neck flask equipped with a dropping funnel, stopper and reflux condenser was added trimethyl-1,6-diisocyanatohexane (mixture of 2,2,4- and 2,4,4-isomers, 118.9 g, 0.57 mol, obtained from Sigma-Aldrich, Milwaukee, Wis.), dibutyltindilaurate (3.60 g, 5.7 mmol, obtained from Sigma-Aldrich, Milwaukee, Wis.) and anhydrous tetrahydrofuran (1 L). To this solution was added 1,4-butanediol vinyl ether (133.2 g, 1.2 mol, obtained from Sigma-Aldrich, Milwaukee, Wis.) via the dropping funnel. After addition of the alcohol, the reaction mixture was stirred at reflux until an FT-IR analysis of an aliquot indicated that all the NCO functionality was consumed. Specifically, the FT-IR showed the absence (disappearance) of a peak at ~2285 cm$^{-1}$ (NCO) and the appearance (or increase in magnitude) of peaks at ~1740-1680 cm$^{-1}$ and ~1540-1530 cm$^{-1}$ corresponding to urethane frequencies. At the completion of the reaction, the solution was cooled to room temperature and methanol (500 mL) was added to quench any residual isocyanate. The reaction mixture was allowed to stir for an additional hour at room temperature before removing the solvent in vacuo. The resultant oil was triturated with hexane (3×250 mL), dissolved in methylene chloride (500 mL) and washed with water (3×500 mL). The organic layer was dried over MgSO$_4$ and the solvent was removed in vacuo to afford 244 g (97% yield) of a pale yellow oil. $^1$H NMR (300 MHz, CDCl$_3$): δ6.47 (2H, dd, J=14.3, 6.8 Hz), 4.88-4.62 (2H, br. m), 4.19 (2H, dd, J=14.3, 1.8 Hz), 4.09 (4H, br. s), 4.00 (2H, dd, J=6.8, 1.8 Hz), 3.70 (4H, br. s), 3.18-2.91 (4H, m), 1.72-1.01 (13H, m), 1.01-0.88 (9H, m).

Example 2

Preparation of Bis[4-(vinyloxy)butyl]dodecanedioate

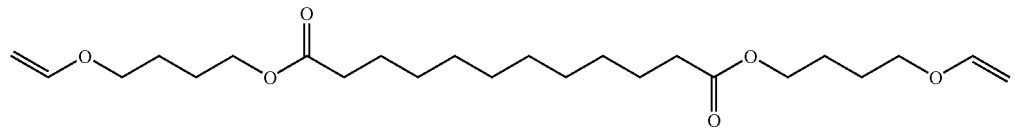

To a 1 L two neck flask equipped with a stir bar, argon inlet and stopper was added dodecanedioic acid (10.0 g, 43 mmol, obtained from Sigma-Aldrich, Milwaukee, Wis.), 1,4-butanediol vinyl ether (10.1 g, 87 mmol, obtained from Sigma-Aldrich, Milwaukee, Wis.), 4-(dimethylamino)pyridine (1.07 g, 8.8 mmol, obtained from Sigma-Aldrich, Milwaukee, Wis.), 1-hydroxybenzotriazole (1.18 g, 8.7 mmol, obtained from Sigma-Aldrich, Milwaukee, Wis.) and methylene chloride (500 mL). The reaction mixture was cooled to 0° C. and 1-[3-(dimethylamino)propyl]-3-ethylcarbodiimide hydrochloride (16.6 g, 87 mmol, obtained from Sigma-Aldrich, Milwaukee, Wis.) was added portionwise. The reaction mixture was stirred at 0° C. for 0.5 h, followed by stirring at room temperature until the reaction was deemed complete by $^1$H NMR spectroscopy in DMSO-$d_6$ (usually 2 h): the signal corresponding to the methylene protons alpha to the carbonyl groups of 1,12-dodecanedioc acid (4H, triplet at δ2.18) was consumed and was replaced by a triplet at δ2.27 (4H), corresponding to $[H_2C=CHO(CH_2)_4OOCCH_2(CH_2)_4]_2$. The reaction mixture was concentrated in vacuo and the residue was dissolved in ethyl acetate (300 mL). The organic layer was washed with saturated sodium bicarbonate (2×150 mL) and water (2×150 mL), dried over anhydrous sodium sulfate, filtered and concentrated in vacuo. The crude product was recrystallized from methanol to afford 13.5 g (73% yield) of a white solid (mp=42-43° C.). $^1$H NMR (300 MHz, CDCl$_3$): δ6.47 (2H, dd, J=14.3, 6.8 Hz), 4.19 (2H, dd, J=14.3, 1.9 Hz), 4.10 (4H, br. t, J=6.0 Hz), 4.00 (2H, dd, J=6.8, 1.9 Hz), 3.70 (4H, br. t, J=5.7 Hz), 2.29 (4H, t, J=7.5 Hz), 1.76-1.71 (8H, m), 1.63-1.56 (4H, m), 1.28 (12H, br. s).

Examples 3-5

Compositions were made containing the components listed in Table 1.

TABLE 1

| Function | Component | Formulation (wt %) | | |
| --- | --- | --- | --- | --- |
| | | Example 3 | Example 4 | Example 5 |
| UV curable monomer | bis[4-(vinyloxy)butyl] trimethyl-1,6-hexanediylbiscarbamate (mixture of 2,2,4- and 2,4,4-isomers) | 51 | 60 | 55 |
| phase change agent | hydrogenated Castor oil | 29 | — | — |
| | 1-octadecanol | — | 30 | 40 |
| viscosity modifier | bis[4-(vinyloxy)butyl] dodecanedioate | 10 | — | — |
| photoinitiator | Ar–S(+)(Ar)(Ar) PF$_6^-$ R-GEN ® BF-1172 (Chitec Chemical Co., Ltd, Taiwan, R.O.C.) | 10 | 10 | 5 |

The samples described in Examples 3-5 were formulated as follows: the UV curable monomer, photoinitiator and, if applicable, viscosity modifier were heated, with stirring, to 100° C. for 0.5 hour, after which time the phase change agent was added and the reaction mixture was stirred for an additional 0.5 hour. The rheological profiles of these compositions are depicted in the FIGURE. The viscosities were measured on a Rheometrics Fluid Spectrometer RFS3 with cone and plate geometry equipped with a Peltier plate at a frequency of 1 Hz. As depicted in the FIGURE, each composition had a viscosity at least four orders of magnitude higher at a temperature between 20° C. and 50° C. as compared to its viscosity at a temperature between 50° C. and 130° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A composition, comprising:
   (a) curable monomer;
   (b) at least one photoinitiator that initiates polymerization of said curable monomer; and
   (c) phase change agent that provides the composition with an increase in viscosity of at least four orders of magnitude, from a first temperature, said first temperature being from 50° C. to 130° C., to a second temperature, said second temperature being from 0° C. to 70° C., wherein the second temperature is at least 10° C. below the first temperature,
   wherein the phase change agent is selected from the group consisting of hydrogenated castor oil, 1,10-decanediol, 1,12-dodecanediol, hydroxyl-terminated polyethylene waxes, 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol, 2-tetradecyl 1-octadecanol, 2-hexadecyl 1-eicosanol, 2-octadecyl 1-docosanol, 2-nonadecyl 1-tricosanol, 2-eicosyl tetracosanol, 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

2. The composition according to claim 1, wherein said first temperature is from 60° C. to 120° C.

3. The composition according to claim 1, wherein said second temperature is from 20° C. to 50° C.

4. The composition according to claim 1, wherein said photoinitiator cationically initiates polymerization of said curable monomer.

5. The composition according to claim 1, wherein said composition is colorless and substantially transparent.

6. The composition according to claim 1, wherein said composition has a viscosity of from 8 to 15 cP at a temperature between 50° C. and 130° C.

7. The composition according to claim 1, wherein the composition has a viscosity at said second temperature that is at least five orders of magnitude greater than its viscosity at said first temperature.

8. The composition according to claim 1, wherein said curable monomer is selected from the group consisting of vinyl ethers, epoxides and oxetanes.

9. The composition according to claim 8, wherein said curable monomer is a diurethane divinyl ether oil.

10. The composition according to claim 1, wherein said phase change agent is at least one alcohol that is solid at the second temperature.

11. The composition according to claim 1, wherein said composition comprises from about 40 to about 70 weight % curable monomer, from about 10 to about 50 weight % phase change agent and from about 1 to about 15 weight % photoinitiator.

12. A method for applying a coating over an image on a substrate, said method comprising:
   (a) providing a composition according to claim 1 at said first temperature;
   (b) applying said composition over said image, said image being at said second temperature; and
   (c) exposing the composition to radiation to initiate polymerization of the curable monomer.

13. The method according to claim 12, wherein said image is a toner image.

14. A method for applying a coating over an image on a substrate, said method comprising:
   (a) providing a composition comprising curable monomer at a first temperature;
   (b) applying said composition over said image, said image being at a second temperature, wherein the composition has a viscosity at said second temperature that is at least four orders of magnitude greater than its viscosity at said first temperature; and
   (c) exposing the composition to radiation to initiate polymerization of the curable monomer.

15. The method according to claim 14, wherein the composition has a viscosity at said second temperature that is at least five orders of magnitude greater than its viscosity at said first temperature.

16. The method according to claim 14, wherein said image is a toner image.

17. The method according to claim 16, wherein said toner image is formed from emulsion aggregation toner.

18. The method according to claim 14, wherein the coating formed over the image is colorless and substantially transparent.

19. The method according to claim 14, wherein said composition is applied over the image by ink jet printing.

20. A xerographic device comprising an image generating component and an ink jet device containing a composition according to claim 1.

* * * * *